(12) United States Patent
Aphale et al.

(10) Patent No.: US 11,379,311 B2
(45) Date of Patent: Jul. 5, 2022

(54) CONFIGURING COMPUTING DEVICES USING A TEMPLATE

(71) Applicant: KeepItSafe, Inc., Hollywood, CA (US)

(72) Inventors: Deepali Aphale, Shrewsbury, MA (US); James Boettcher, Ashland, MA (US); Leila Rossi, Braintree, MA (US)

(73) Assignee: KEEPITSAFE, INC., Los Angeles, CA (US)

( * ) Notice: Subject to any disclaimer, the term of this patent is extended or adjusted under 35 U.S.C. 154(b) by 250 days.

(21) Appl. No.: 16/679,173

(22) Filed: Nov. 9, 2019

(65) Prior Publication Data
US 2020/0089577 A1 Mar. 19, 2020

Related U.S. Application Data

(63) Continuation of application No. 13/688,357, filed on Nov. 29, 2012, now abandoned.

(51) Int. Cl.
*G06F 16/00* (2019.01)
*G06F 11/14* (2006.01)

(52) U.S. Cl.
CPC .................. *G06F 11/1458* (2013.01)

(58) Field of Classification Search
None
See application file for complete search history.

(56) References Cited

U.S. PATENT DOCUMENTS

| | | | | |
|---|---|---|---|---|
| 7,831,968 B1* | 11/2010 | Weathersby | ............... | G06F 8/60 717/174 |
| 8,417,926 B2* | 4/2013 | DeHaan | .................... | G06F 8/60 713/1 |
| 2002/0165961 A1* | 11/2002 | Everdell | .................. | H04L 41/22 709/225 |
| 2003/0126195 A1* | 7/2003 | Reynolds | ............ | G06F 11/2038 714/E11.008 |
| 2006/0143530 A1* | 6/2006 | Largman | .............. | G06F 11/1417 714/36 |
| 2010/0287221 A1* | 11/2010 | Battepati | ............... | G06F 16/122 707/803 |

OTHER PUBLICATIONS

Configuration management at massive scale_system design and experience, Enck et al., IEEE (Year: 2009).*

* cited by examiner

*Primary Examiner* — Jean M Corrielus
(74) *Attorney, Agent, or Firm* — Womble Bond Dickinson (US) LLP (57) ABSTRACT

According to example implementations, computing devices are configured using a template. The template specifies at least one computing device property and backup control information relating to backing up data from the computing devices to a backup system. The computing devices are reconfigured in response to modification of the template.

20 Claims, 5 Drawing Sheets

CONFIGURING COMPUTING DEVICES USING A TEMPLATE

BACKGROUND

A computing environment can include a number of computing devices. Examples of such computing devices include servers, such as data servers (which can be accessed by client devices to access data stored in storage subsystems accessible by the data servers), or other types of servers.

Servers deployed in a computing environment are configured to allow the servers to perform their respective functions, such as to perform backup of certain data to a backup system. In some cases, servers can be manually configured (such as for data backup) by information technology (IT) personnel or other users.

BRIEF DESCRIPTION OF THE DRAWINGS

Some embodiments are described with respect to the following figures.

DETAILED DESCRIPTION

Configuring a relatively large number of computing devices in a computing environment can be time consuming, particularly if the configuring is performed manually. In some examples, configuring the computing devices can include configuring the computing devices to perform data backup operations (discussed further below). Manual configuration of computing devices can result in inconsistent configuration of the computing devices. Manual configuration can also lead to mis-configuration of some of the computing devices.

In some implementations, the computing devices of a computing environment can include data servers, which can include backup agents to perform backup of data to a cloud-based backup system or other type of backup system. In other implementations, the computing devices can include other types of servers or other computing devices. Examples of other computing devices include any or some combination of the following: desktop computers, notebook computers, tablet computers, smart phones, personal digital assistants (PDAs), and so forth.

In the ensuing discussion, reference is made to configuration of servers using techniques or mechanisms according to some implementations. However, in other examples, similar configuration techniques or mechanisms can be applied to other types of computing devices.

In accordance with some implementations, to improve efficiency in configuring servers, a server template can be used. The server template is a container that includes configuration information that can be retrieved by multiple servers for configuring the servers. Note that configuring a server can refer to configuring machine-readable instructions (software and/or firmware) of the server. As discussed further below, the server template includes (1) at least one server property, and (2) backup control information (which can specify a backup policy and/or backup rule). In some examples, the backup control information can be part of a backup template that is included in the server template.

The backup control information is related to performing backup of selected data of the servers to a backup system. The backup of selected data is performed according to the backup control information. Backing up data of a server to the backup system can involve copying the data from the server to the backup system. Alternatively, backing up data can involve archiving the data of the server, where the archived data is moved from the server to the backup system.

In some examples, the backup system can reside in a cloud; such a backup system is referred to as a cloud-based backup system. A "cloud" can refer to any arrangement of one or multiple systems that can store backup data on behalf of the servers, and where the one or multiple systems are accessible over a network. The cloud-based backup system can be available over a public network, such as the Internet, or over an internal network of an enterprise (business concern, educational organization, government agency, etc.).

The server template can be used to automatically configure multiple servers such that individual configuration of the servers does not have to be performed. By using the server template, the servers associated with the server template form a group of servers having certain aspects that are configured identically with each other, based on the server template.

In some cases, other servers not associated with server template can be configured differently. For example, the other servers can be individually configured using different server configuration information.

In other examples, multiple server templates can be provided for configuring respective different groups of servers. For example, a first server template can be used to configure a first group of servers, a second, different server template can be used to configure a second, different group of servers, and so forth.

Although reference is made to a server template used to configure servers, it is noted that the template can be a more general template that can be used to configure other types of computing devices. Such template can include at least one computing device property and backup control information.

A server property can be a property that describes an operational feature or aspect of a server. This is a property that controls how the server operates or behaves. An example of a server property can include contact information (e.g. information identifying a primary technical contact and/or secondary technical contact), which identifies personnel to contact in case of a fault, failure, or other issue. Also, another example of a server property can include an auto-upgrade setting, which can specify one or multiple criteria associated with automatically upgrading the server, including the upgrade of machine-readable instructions (e.g. software and/or firmware) of the server. Another example server property includes a subscription property, which relates to options useable by a server to set the backup control information. Although various example server properties are listed, it is noted that other or additional server properties can be used in other examples.

Backup control information can include a backup policy and/or a backup rule associated with backing up data from the server to a backup system (such as a cloud-based backup system). For example, a backup policy can include a schedule that controls when data is backed up from the server to the backup system. As another example, a backup policy can include a retention policy that specifies one or multiple retention criteria associated with retaining backup data. An example retention criterion can be an age-based criterion that specifies an age past which backup data is to be deleted.

A backup rule can identify data that is to be backed up, and further data that is not to be backed up. For example, the backup rule can specify the types of data that are to be backed up, locations of data that are to be backed up, and so forth.

Figure 1:
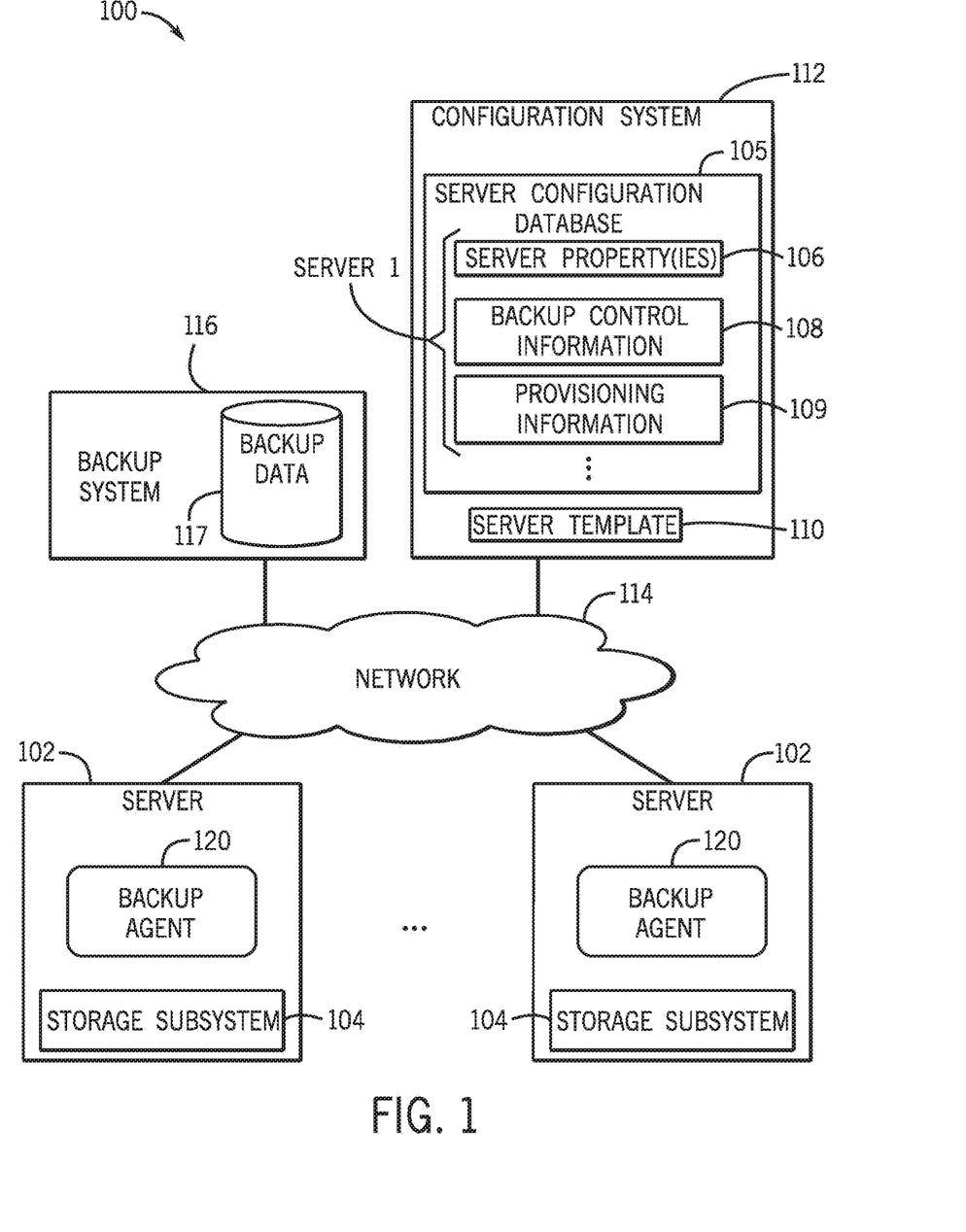
FIG. 1 is a block diagram of an example computing environment that incorporates some implementations.

FIG. 1 is a block diagram of an example computing environment 100 that includes servers 102. Each server 102 has a storage subsystem 104 to store data. Although the storage subsystem 104 is depicted as being part of the server 102, in other examples, the storage subsystem 104 can be external of the server 102, but is accessible by the server 102.

Each server 102 also includes a backup agent 120 that is able to perform backup of data from the corresponding storage subsystem 104 to a backup system 116. The server 102 (and more specifically the backup agent 120 in the server 102) can be configured based on content in a server configuration database 105 in a management system 112. The server configuration database 105 can include multiple instances of configuration data for respective servers. In the example of FIG. 1, a configuration data instance for a first server (server 1) is shown. Similar configuration data instances for other servers can be included in the server configuration database 105.

The configuration data instance for server 1 (which can be one of the servers 102 of FIG. 1) includes server property (ies) 106 and backup control information 108. In accordance with some implementations, the server property(ies) 106 and backup control information 108 for a server 102 can be set using a server template 110, which can also be stored at the configuration system 112. For improved efficiency, the server properties 106 and backup control information 108 for multiple servers 102 associated with the server template 110 can be set using the server template 110. As noted above, the server template 110 can include at least one server property (including, for example, contact information, an auto-upgrade setting, a subscription property, and so forth, as discussed above) and backup control information. In some examples, the backup control information can be part of a backup template that is included in the server template.

Other servers 102 can be configured individually rather than based on the server template 112. The server properties 106 and backup control information 108 of such other servers can be set individually, such as by manual configuration.

In some implementations, configuring a server 102 is accomplished by setting the configuration data (the server property(ies) 106 and backup control information 108) associated with the server 102 at the configuration system 112, either based on the server template 110 or based on individual configuration. The server 102 (and more specifically, the backup agent 120) can access its configuration by retrieving the configuration data at the configuration system 112.

For example, the server 102 can poll (such as periodically or in response to other events) the configuration system 112 for the current configuration data for the server 102. In such examples, each server 102 does not have to persistently store the configuration data, but can instead access the configuration data at the configuration system 112 each time the server 102 has to perform an operation that is controlled by the configuration data.

In alternative implementations, the configuration data (the server property(ies) 106 and backup control information 108) of a server 102 can be persistently stored at the server 102 (instead of at the configuration system 112). In such alternative implementations, configuring a server 102 involves setting the server property(ies) 106 and backup control information 108 at the server 102 using the server template 110 or using an individual configuration.

The servers 102 are able to communicate with the configuration system 112 over a network 114, which can be a public network (e.g. Internet) or can be a private network (such as a network in an enterprise). Backup data from the servers 102 can also be communicated to the backup system 116 over the network 114.

The backup system 116 can be a cloud-based backup system or other type of backup system. The backup system 116 includes a backup storage subsystem 117 that can be used to store backup data. The backup storage subsystem 117 can be provided at one location, or can be distributed across multiple locations.

Data of a storage subsystem 104 in a server 102 can be backed up to the backup system 116 according to the backup control information 108. The data to be backed up can be copied or moved over the network 114 to the backup system 116.

In addition to enhancing efficiency in the initial configuration of servers 102 based on the server template 110, use of the server template 110 also allows for more efficient reconfiguration of the servers 102. Server reconfiguration can be accomplished by modifying the server template 110. In response to modifying the server template 110, which can include a change of a server property and/or the backup control information of the server template 110, automatic reconfiguration of the servers 102 can be performed.

A server 102 can either be associated with the server template 110 or not associated with the server template 110. Provisioning information 109 can be included in the configuration data for each server 102 to indicate whether or not the server 102 is associated with the server template 110. If the server 102 is associated with the server template 110, then the server 102 is configured based on the server template 110. On the other hand, if the server 102 is not associated with the server template 110, then the server 102 is not configured based on the server template 110, but instead is configured individually. The provisioning information 109 can include (1) an association indication that indicates that the server 102 is associated with the server template 110, and (2) template identification information identifying the server template 110 (from among multiple server templates) to use.

If the association indication is provided with the provisioning information 109, which indicates that the server 102 is to be configured using the corresponding server template 110, then the configuration system 112 accesses the server template 110 (identified in the provisioning information 109) to perform configuration of the server 102.

In some implementations, it is possible for a server 102 to disassociate from the server template 110, such as by not including the association indication in the provisioning information 109. In this case, the configuration system 112 does not configure the server 102 with any server template. A server 102 can be disassociated from the server template 110 in those situations where it is determined that the server 102 should have a configuration that is different from the configuration specified by the server template 110.

In other examples, the server 102 can disassociate from a first server template, and then associate with a second, different server template to configure the server 102 according to the second server template.

Figure 2:
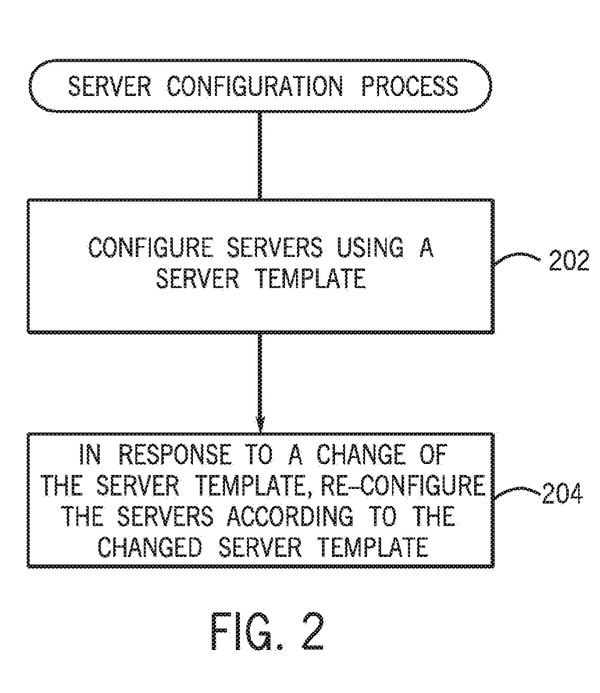
FIG. 2 is a flow diagram of a server configuration process according to some implementations.

FIG. 2 is a flow diagram of a server configuration process according to some implementations. The process of FIG. 2 can be performed by the configuration system 112. The server configuration process configures (at 202) the servers 102 using the server template 110. Configuring the servers 102 includes setting the server property(ies) 106 and/or backup control information 108 associated with each server 102 based on the respective at least one server property and/or backup control information in the server template 110. As noted above, in some implementations, the server property(ies) 106 and backup control information 108 for a given server can be included in the server configuration database 105 at the configuration system 112. In alternative implementations, the server property(ies) 106 and backup control information 108 for the given server 102 can be persistently stored at the given server 102.

In response to a change of the server template 110 (which can include a change of the at least one server property and/or backup control information in the server template 110), the servers 102 can be reconfigured (at 204) according to the changed server template 110.

By using techniques or mechanisms according to some implementations, more efficient configuration/reconfiguration of servers 102 can be performed. Multiple servers can be configured using the server template 110 in a more timely and consistent fashion. Additionally, by being able to reconfigure servers 102 using a modified server template 110, server configuration changes can be easily made across multiple servers 102.

Figure 3:
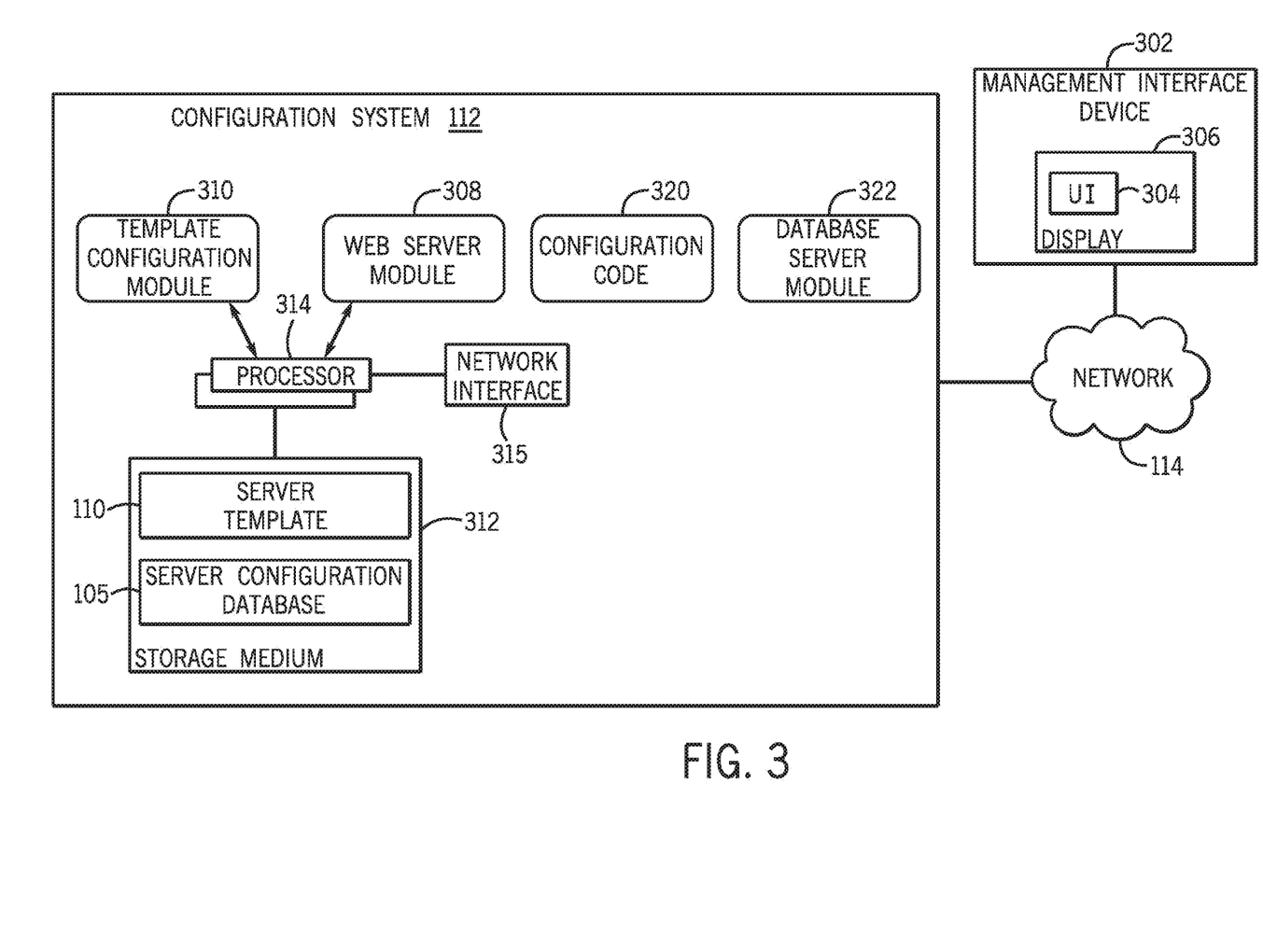
FIG. 3 is a block diagram of an example arrangement that includes a management interface device and a configuration system according to some implementations.

FIG. 3 depicts an example arrangement in which a management interface device 302 can be used for creating the server template 110 at the configuration system 112. The management interface device 302 includes a management user interface 304 displayed in a display 306 of the client device 302. The management interface device 302 can include a computer (e.g. notebook computer, desktop computer, tablet computer), a smart phone, a PDA, or other electronic device.

The management user interface 304 can be a web-based user interface provided by a web server module 308 of the configuration system 112. For example, the management interface device 102 can access the web server module 308 to download a web page to provide the management user interface 304. In other examples, a different type of user interface 304 can be employed, such as a command line interface (in which commands are submitted as command lines).

The management user interface 304 can include various control elements that are selectable by a user of the management interface device 302 to create the server template 110. The user can use the control elements (e.g. control menu items, text boxes to enter text data, etc.) of the user interface 304 to specify server properties and backup control information to be included in the server template 110.

The configuration system 112 further includes a template configuration module 310, which is able to receive commands and other input information from the management interface device 302 based on user input. In response to the commands and other input information from the management interface device 302, the template configuration module 310 builds the server template 110. The server template 110 can be stored in a storage medium 312 of the configuration system 112. The management interface device 302 also allows a user to designate a group of servers 102 that are to be configured with the server template 110. For example, the user can use a command line interface to designate the servers 102 that are associated with the server template 110. Alternatively, the management user interface 304 can include fields for the user to select servers 102. In response to the user selection, the configuration system 112 can provision the selected servers 102 to use the server template 110 for configuration of the servers 102 in the group.

The configuration system 112 also includes configuration code 320 to set respective configuration data (of servers 102 associated with the server template 110) based on the server template 110.

In addition, the configuration system 112 includes a database server module 322 that is able to retrieve configuration data from the server configuration database 105 in response to a request from a server 102. The server configuration database 105 can be stored in the storage medium 312.

The template configuration module 310, web server module 308, configuration code 320, and database server module 322 can be implemented as machine-readable instructions executable on one or multiple processors 314 in the configuration system 112. The configuration system 112 further includes a network interface 315 to allow the configuration system 112 to communicate over the network 114.

The management interface device 302 can be used by a user to modify a previously created server template 110. Modifying the server template 110 at the configuration system 112 can trigger a reconfiguration of the servers 102 associated with the server template 110. The reconfiguration of the servers 102 can be accomplished by the configuration code 320 updating the respective configuration data in the server configuration database 105 using the modified server template 110.

The management interface device 302 can also be used by a user to associate or disassociate a given server 102 with a server template. For example, the user can submit a command in a command line interface or other user interface at the management interface device 302 to specify whether or not the given server 102 is to be associated or not associated with the server template. Associating the given server 102 can be indicated with an association indication in the provisioning information 109 (FIG. 1).

Figure 4:
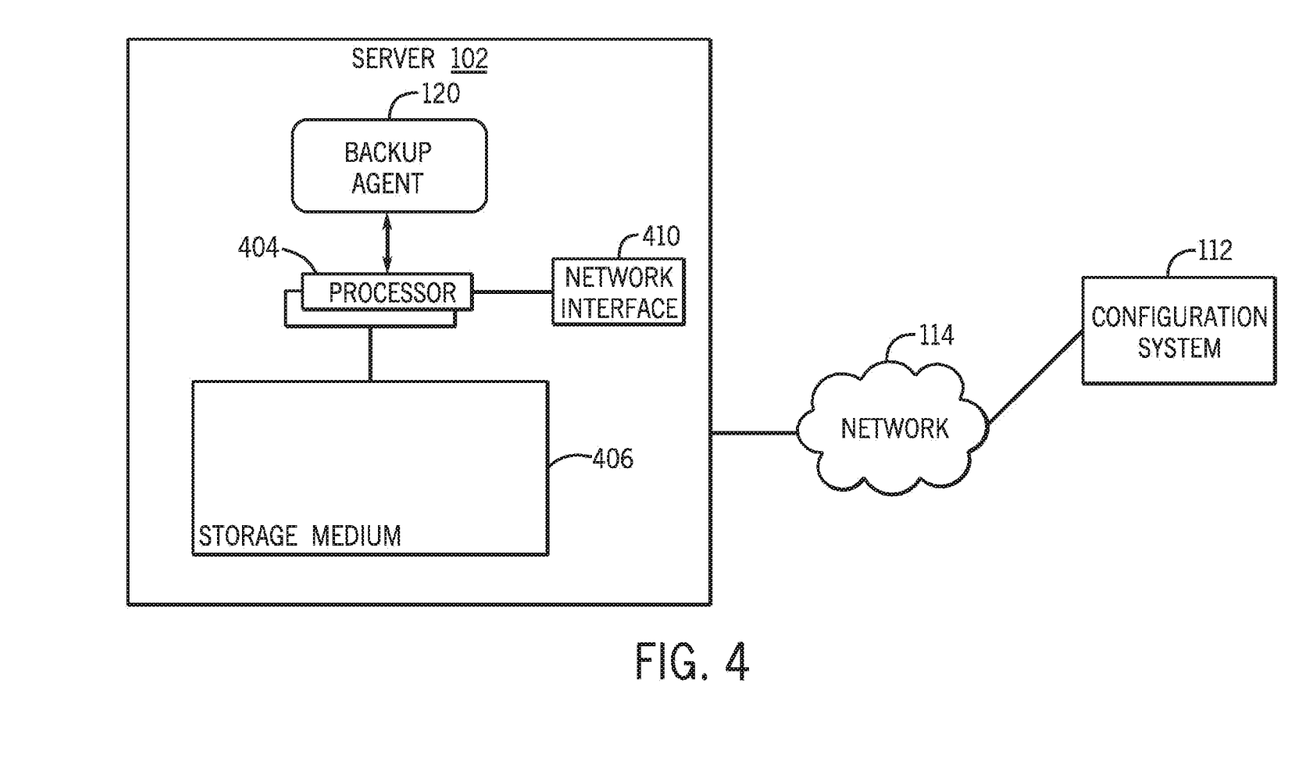
FIG. 4 is a block diagram of a server that is configurable using a server template according to some implementations.

FIG. 4 is a block diagram of an example arrangement including a server 102 and the configuration system 112. The server 102 includes the backup agent 120, which can be implemented as machine-readable instructions executable on one or multiple processors 404 in the server 102. The backup agent 120 is used to perform backup of data stored or managed by the server 102 to the backup system 116 (FIG. 1). The server 102 includes a network interface 410 to allow the server 102 to communicate over the network 114. The server 102 also includes a storage medium 406 accessible by the processor(s) 404.

Figure 5:
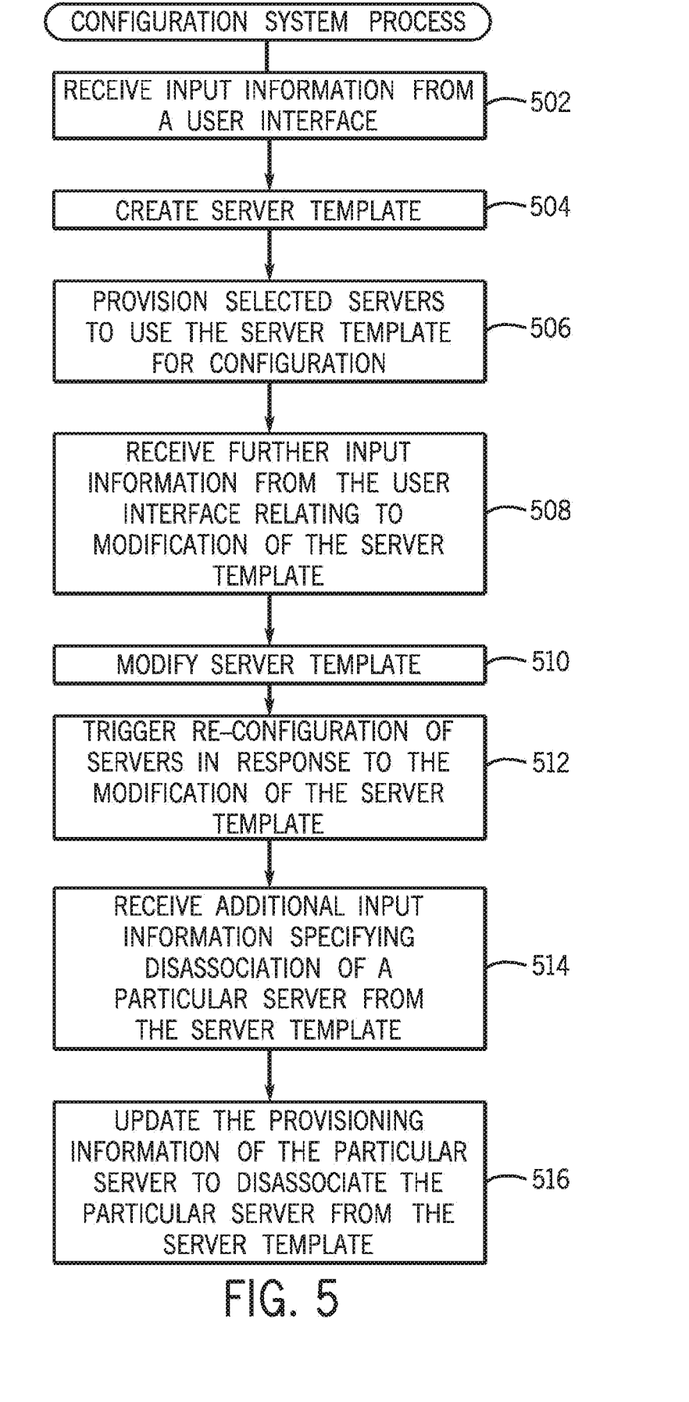
FIG. 5 is a flow diagram of a process of a configuration system according to some implementations.

In operation, the backup agent 120 is able to submit a request to the configuration system 112 to access the respective configuration data in the server configuration database 105. The backup agent 120 is able to operate according to the configuration defined by the retrieved server property(ies) 106 and backup control information 108. FIG. 5 is a flow diagram of an example process performed by the configuration system 112 of FIG. 3. The configuration system 112 receives (at 502) input information from the management interface device 302 (FIG. 3) that relates to content of the server template 110. In response to the received input information, the configuration system 112 creates (at 504) the server template 110.

The configuration system 112 further provisions (at 506) selected servers 102 to use the server template 110 for configuration of the servers 102. As noted above, the servers selected for configuration by the server template 110 can be specified at the management interface device 102 (such as in a command line interface or other user interface). Provisioning the selected servers can involve setting the association indication in the provisioning information 109 (FIG. 1) for each of the selected servers 102 to associate each server 102 with the server template 110.

Subsequently, the configuration system 112 receives (at 508) further input information from the user interface 304 relating to modification of the server template 110. Based on the further input information, the configuration system 112 modifies (at 510) the server template 110. The configuration system 112 next triggers (at 512) reconfiguration of the servers 102 associated with the server template 110 in response to the modified server template 110.

An issue associated with performing reconfiguration of the server 102 may be that there can be a data backup operation that is ongoing. In response to notification of modification of the server template 110, the configuration code 320 in the configuration system 112 (FIG. 3) can determine whether the modified configuration information of the server template 110 would affect an ongoing operation of a server 102. If not, the modified property (server property and/or backup control information) of the server template 110 can be applied immediately to set the respective configuration data in the server configuration database 105, without waiting for the ongoing operation to complete. For example, modifying a server property of the server template 110 would not affect an ongoing operation of the server 102. However, modifying the backup control information of the server template 110 may affect an ongoing operation of the server 102.

If the modified property at the server template 110 would affect an ongoing operation, the configuration code 320 checks for the type of change (e.g. modified backup control information) that is made to the server template 110. The following are the possible change status that can be associated with the backup control information of the server template 110: no change (which indicates that the backup control information of the server template 110 has not been changed), only the backup policy has changed, only the backup rule has changed, or both the backup policy and backup rule have changed.

To change a backup policy at the server 102, the configuration code 320 first waits for a current backup operation (or multiple current backup operations) to complete. After completion of the backup operation(s), the configuration code 320 applies the change to the respective configuration data in the server configuration database 105.

To change a backup rule at the server 102, the configuration code 320 also waits for a current backup operation (or multiple current backup operations) to complete. After completion of the backup operation(s), the configuration code 320 applies the change of the backup rule to the respective configuration data in the server configuration database 105. Changing the backup rule involves deleting the backup rule, and generating a new backup rule, which is a more complex process than changing the backup policy, which can be accomplished by modifying a parameter or multiple parameters (e.g. an age associated with a data retention policy) of the backup policy.

As further depicted in FIG. 5, the configuration system 112 can also receive (at 514) additional input from the user interface 304 specifying disassociation of a particular server 102 from the server template 110. In response to the additional input information, the configuration system 112 updates (at 516) the provisioning information 109 of the particular server 102 to disassociate the particular server 102 from the server template 110.

Various modules described above, including the backup agent 120, template configuration module 310, web server module 308, and configuration code 320, and database server module 322 of FIG. 3 or 4, can be implemented as machine-readable instructions executed on one or multiple processors (such as 314 or 404 in FIG. 3 or 4). A processor can include a microprocessor, microcontroller, processor module or subsystem, programmable integrated circuit, programmable gate array, or another control or computing device.

Data and instructions are stored in respective storage devices, which are implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A computer-implemented method for configuring a plurality of computing devices to perform data backup operations in which data of the computing devices are backed up to a backup system, the method comprising:
   i. building a template that specifies at least one computing device property and backup control information relating to backing up data to a backup system;
   ii. provisioning a plurality of computing devices to use the template to become configured, according to respective configuration data, to backup data stored in the plurality of computing devices to the backup system in accordance with the template;
   iii. changing the template responsive to receiving input information from a user interface; and iv. in response to the changed template, determining whether or not the changed template would affect an ongoing backup operation of at least one of the plurality of computing devices,
   when the changed template specifies a modification of the at least one computing device property, which does not affect the ongoing backup operation, then the modification is applied to set the respective configuration data of the computing device without waiting for the ongoing backup operation to complete, and
   when the changed template specifies a modification of the backup control information, which does affect the ongoing backup operation, then determining a modification type of the backup control information, wherein the modification type is one of: no change, only a backup policy has changed, only a backup rule has changed, and both a backup policy and a backup rule have changed, and the modification is applied, to set the respective configuration data of the computing device which configures a backup agent in the computing device, only after waiting for the ongoing backup operation to complete.

2. The method of claim 1 further comprising performing backup, by the backup agents copying data from the plurality of computing devices to the backup system.

3. The method of claim 1, further comprising performing backup, by the backup agents archiving or moving data from the plurality of computing devices to the backup system.

4. The method of claim 1 wherein the backup system is a cloud-based backup system.

5. The method of claim 1 wherein the at least one computing device property specified in the template comprises information on how to contact personnel in case of a fault or failure.

6. The method of claim 1 wherein the backup control information specified in the template comprises a backup policy or backup rule on how to backup data to the backup system.

7. The method of claim 6 wherein the backup policy comprises a schedule that controls when data is backed up to the backup system.

8. The method of claim 6 wherein the backup policy comprises a retention policy that species an age past which backup data is to be deleted.

9. The method of claim 6 wherein the backup rule identifies which type or location of data is to be hacked up, and which type or location of data, is not to be backed up.

10. The method of claim 1 wherein the template is centrally stored in a configuration system and is to be accessed by the plurality of computing devices.

11. An article of manufacture comprising:
a machine-readable storage medium storing instructions that upon execution cause a computing system to
i. build a template that specifies at least one computing device property and backup control information relating to backing up data to a backup system;
ii. provision a plurality of computing devices to use the template to become configured, according to respective configuration data, to backup data stored in the plurality of computing devices to the backup system in accordance with the template;
iii. change the template responsive to receiving input information from a user interface; and
iv. in response to the changed template, determine whether or not the changed template would affect an ongoing backup operation of at least one of the plurality of computing devices,
   when the changed template specifies a modification of the at least one computing device property, which does not affect the ongoing backup operation, then the modification is applied to set the respective configuration data of the computing device which configures a backup agent in the computing device, without waiting for the ongoing backup operation to complete, and
   when the changed template specifies a modification of the backup control information, which does affect the ongoing backup operation, then determine a modification type of the backup control information, wherein the modification type is one of: no change, only a backup policy has changed, only a backup rule has changed, and both a backup policy and a backup rule have changed, and the modification is applied, to set the respective configuration data of the computing device, only after waiting for the ongoing backup operation to complete.

12. The article of manufacture of claim 11 wherein the template is to be accessed by a plurality of backup agents, respectively, in the plurality of computing devices.

13. The article of manufacture of claim 12 wherein the template specifies that a backup be performed by the backup agents archiving or moving data from the plurality of computing devices to the backup system.

14. The article of manufacture of claim 12 wherein the template specifies that a backup be performed by the backup agents copying data from the plurality of computing devices to the backup system.

15. The article of manufacture of claim 11 wherein the backup system is a cloud-based backup system.

16. The article of manufacture of claim 11 wherein the at least one computing device property specified in the template comprises information on how to contact personnel in case of a fault or failure.

17. The article of manufacture of claim 11 wherein the backup control information specified in the template comprises a backup policy or backup rule on how to backup data, to the backup system.

18. The article of manufacture of claim 17 wherein the backup policy comprises a schedule that controls when data is backed up to the backup system.

19. The article of manufacture of claim 17 wherein the backup policy comprises a retention policy that species an age past which backup data is to be deleted.

20. The article of manufacture of claim 17 wherein the backup rule identifies which type or location of data is to be hacked up, and which type or location of data is not to be backed up.

* * * * *